United States Patent [19]

Häusler et al.

[11] 4,429,357

[45] Jan. 31, 1984

[54] METHOD FOR PLACING INTO OPERATION A SERIES CONNECTED GROUP OF STATIC POWER CONVERTERS OF A HIGH VOLTAGE DIRECT-CURRENT TRANSMISSION INSTALLATION

[75] Inventors: Michael Häusler, Hirschberg; Karl-Werner Kanngiesser, Viernheim, both of Fed. Rep. of Germany

[73] Assignee: BBC Brown, Boveri & Company Limited, Baden, Switzerland

[21] Appl. No.: 269,371

[22] Filed: Jun. 1, 1981

[30] Foreign Application Priority Data

Jun. 25, 1980 [DE] Fed. Rep. of Germany ....... 3023698

[51] Int. Cl.³ .......................... H02J 3/36; H02H 7/00
[52] U.S. Cl. ........................................ 363/68; 363/51; 363/35
[58] Field of Search ....................... 363/35, 37, 51-58, 363/67-71, 84-88; 323/207, 212

[56] References Cited

U.S. PATENT DOCUMENTS

| 3,499,165 | 3/1970 | Madzarevic et al. ............. 363/51 X |
| 3,629,685 | 12/1971 | Johansson ............................. 363/51 |
| 4,020,411 | 4/1977 | Tsuboi et al. ......................... 363/68 |
| 4,181,932 | 1/1980 | Fujiwara .............................. 363/68 |

FOREIGN PATENT DOCUMENTS 2512364 10/1975 Fed. Rep. of Germany .
2514227 9/1976 Fed. Rep. of Germany .
1811199 12/1976 Fed. Rep. of Germany .

OTHER PUBLICATIONS

Kimbark, "Direct Current Transmission", vol. 1, Wiley-Interscience, a division of John Wiley & Sons, Inc. (1971), pp. 167–169.

Primary Examiner—Peter S. Wong
Attorney, Agent, or Firm—Werner W. Kleeman

[57] ABSTRACT

In order to place into operation a group of power converters which are connected in series as concerns the direct-current mode and in parallel as concerns the alternating-current mode, of a power or current converter operating in a rectifying mode of a high-voltage direct-current transmission installation, the control pulses of the group of power converters to be placed into operation are set at a range of approximately 100 to 115 electrical degrees. The bypass or shunt switch of such group of power converters subsequently receives an opening command. The control pulses, after accomplishment of opening of the bypass or shunt switch are shifted in accordance with a predetermined linear ramp function in the rectifying range and thereafter the control pulses are delivered by means of a pole current regulator. The placement into operation of a power converter operating in the inverting mode is accomplished in a similar fashion. Reactive power swings or fluctuations between the network and the power converters are avoided.

4 Claims, 1 Drawing Figure

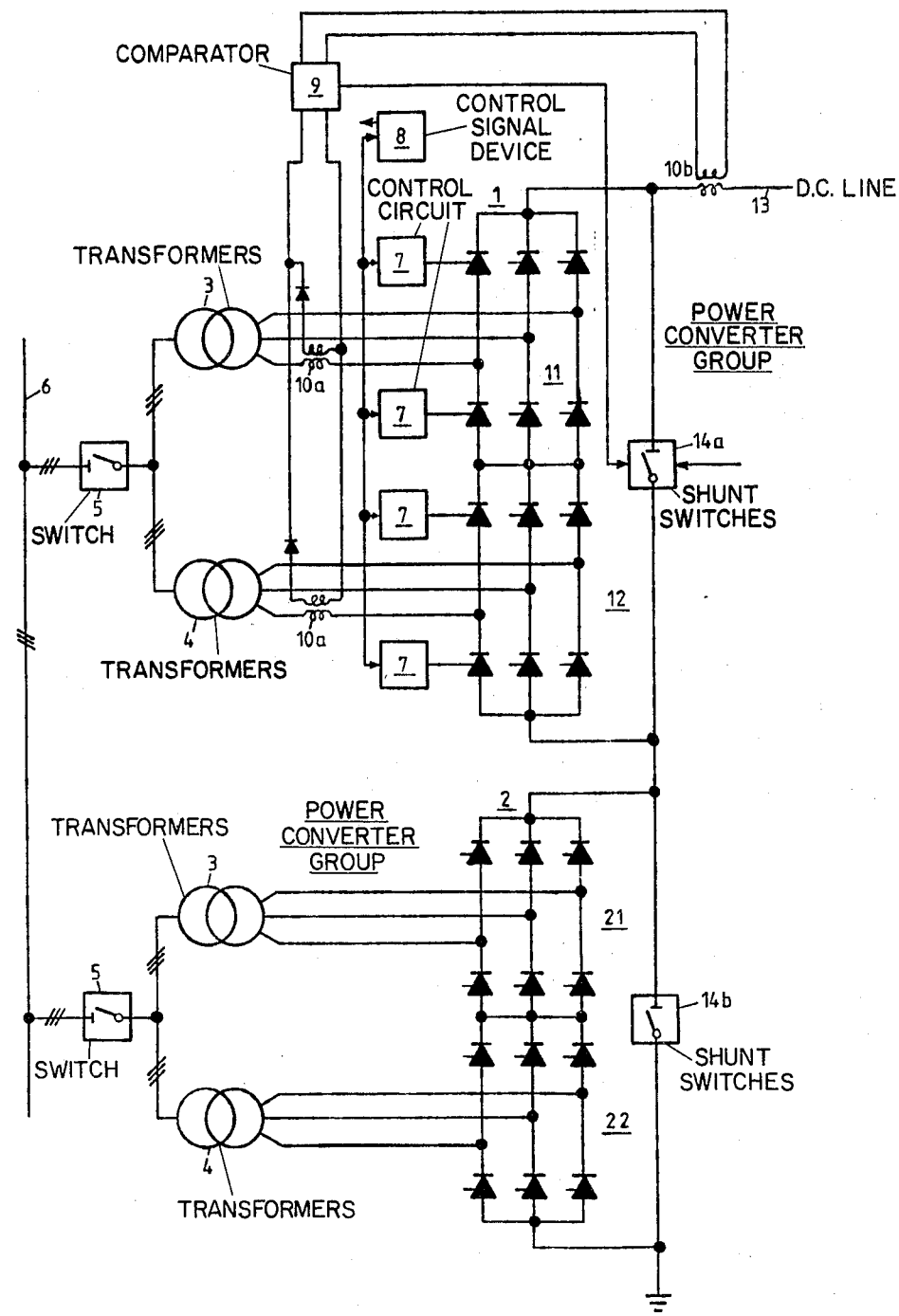

METHOD FOR PLACING INTO OPERATION A SERIES CONNECTED GROUP OF STATIC POWER CONVERTERS OF A HIGH VOLTAGE DIRECT-CURRENT TRANSMISSION INSTALLATION

BACKGROUND OF THE INVENTION

The present invention relates to a new and improved method of placing into operation one of a number of power converter units or groups which as concerns the direct-current are connected in series and as concerns the alternating-current in parallel, of a power converter operating in the rectifying mode and inverting mode, respectively, of a high-voltage direct-current transmission installation, wherein a bypass or shunt switch is connected in parallel with each power converter group.

Such techniques are known in this technology from, for instance, German Patent No. 2,514,227, published Sept. 9, 1976, and German Patent Publication No. 2,512,364.

For power converter groups or units connected in series during systems operation there arises the task of incorporating during the operation of a power converter group a further power converter group into the current or power circuit without first having to interrupt the operation. To this end, the power transmission either should not be effective at all or in a predetermined manner, for instance approximately with a linear ascent within a desired settable time. It is desired that the thus arising reactive power fluctuations at the terminal stations should be maintained as brief in duration as possible or that, in the event there is accomplished an increase in the active or true power, the reactive power should increase approximately proportionally with the active power.

The new group of power converters which is to be placed into operation is initially shunted by a bypass or shunt switch which must be opened during placement into operation of the power converter group. The switch current also must be commutated to the power converter group without endangering the switch.

With the heretofore known methods this is accomplished with the aid of a special start-up regulation. However, this is associated with the drawback that prior to opening of the bypass or shunt switch there is regulated into the power converter the entire current flowing in the direct-current line. During the regulation or adjustment time the power converter group which is to be placed into operation is in its zero voltage operational mode. Its apparent power therefore is practically pure reactive power and at the rated current it is approximately as great as its rated power.

During the regulation or adjustment time of the start-up regulator, which amounts to about 0.5 to 1 second, the generators of the power network have the opportunity of setting the additionally required reactive power. As soon as the bypass switch has been opened and the power converter group which has been placed into operation runs-up with its voltage there is reduced the power converter-reactive power. In the case of two power converter groups or units which are connected in series the line pole at the end of the compensation operation, with constant transmission power, carries one-half of the current at twice the potential. The reactive power of both power converter groups is approximately exactly as great as the original power converter-reactive power (at full current and half line voltage).

Therefore, the generators must again be returned to their old reactive power value. This is also true for the placement into operation of more than two power converter groups connected in series. To avoid an excess of reactive power and thus overvoltages during the start or running-up of the power converter which is to be placed into operation, the run-up control of the direct-current voltage, with the heretofore known methods, disadvantageously must be accomplished so slowly that the reactive power regulation of the network can follow.

SUMMARY OF THE INVENTION

Therefore, with the foregoing in mind it is a primary object of the present invention to provide a new and improved method of placing into operation a series connected group of static power converters of a high-voltage direct-current power transmission installation in a manner not associated with the aforementioned drawbacks and limitations of the prior art proposals.

Another and more specific object of the present invention aims at avoiding reactive power swings between the network and the power converters which arise when practicing the state-of-the-art methods, and, furthermore, simplifying the placement into operation of the groups of static power converters.

Now in order to implement these and still further objects of the invention, which will become more readily apparent as the description proceeds, at a power converter operating in the rectifying mode the control pulses of the power converter group which is to be placed into operation is set at a range of approximately 100 to 115 electrical degrees, thereafter the bypass or shunt switch of this power converter group receives an opening command, the control pulses, after accomplishing opening of the bypass switch, are displaced or shifted in accordance with a predeterminable linear ramp function in the rectifying range, and then the control pulses are set or determined by a pole current regulator.

In the case of a power converter operating in the inverting mode the objectives of the invention are realized in that the control pulses of the power converter group which is to be placed into operation are set at a range of approximately 100 to 115 electrical degrees, the bypass or shunt switch of this power converter group thereafter receives an opening command, the control pulses, after accomplishing opening of the bypass or shunt switch, is displaced with a predeterminable linear ramp function initially in the rectifying mode up to a predeterminable control threshold angle of approximately 85 electrical degrees, then there is undertaken a revertive control of the control pulses in the inverting mode up to the greatest possible control angle, and thereafter the control pulses are set by an extinguishing angle regulator.

The advantages which can be realized when practicing the invention particularly reside in the fact that there is not required an actual start-up regulator and placement into operation of the power converter is shortened.

BRIEF DESCRIPTION OF THE DRAWINGS

The invention will be better understood and objects other than those set forth above, will become apparent when consideration is given to the following detailed description thereof. Such description makes reference to the annexed drawing wherein:

the single FIGURE schematically illustrates a block circuit diagram of circuitry useful in practicing the method of the invention.

DETAILED DESCRIPTION OF THE PREFERRED EMBODIMENTS

Describing now the drawing, there is illustrated therein a station pole of a power converter station. The station pole contains two power converter groups 1 and 2 which as to the alternating-current mode are connected in each case at two power converter transformers 3 and 4. The power converter transformers 3 and 4 can be connected in each case by means of a respective power switch 5 with a three-phase power network 6.

Each power converter group or unit 1 and 2 can consist, for instance, of two or more power converter bridge circuits 11, 12 and 21, 22, respectively. The power converter groups 1 and 2 are connected in series as concerns the direct-current, whereas the terminal points of the series circuit are connected on the one hand with a direct-current line 13 and, on the other hand, with the grounded center point of the power converter station.

As the valves there can be employed for the power converter bridge circuits 11, 12, 21, 22 in each case thyristors or chains of series connected thyristors. The not particularly referenced control electrodes of each thyristor chain are connected with a related control circuit 7, and there have only been illustrated as a matter of convenience and simplification of the representation of the drawing the control circuits 7 for one phase of the power rectifier group 1. These control circuits 7 may be constituted by conventional control pulse amplifiers, for instance as disclosed in German Pat. No. 1,811,199, granted Dec. 2, 1976, and serve to generate ignition pulses. The control circuits 7 are connected with a control signal device 8 which may be constituted by a conventional automatic pulse phase shifter or a ramp voltage generator, for instance as disclosed in FIG. 1b of U.S. Pat. No. 4,020,411, granted Apr. 26, 1977. A comparison element or comparator 9 has delivered thereto, by means of a current transformer 10a arranged in circuit between the power converter transformers 3 and 4 and the power converter bridge circuits 11, 12, 21 and 22 a rectified alternating-current value or magnitude and, by means of a direct-current transformer 10b arranged in the direct-current line 13 a direct-current value or magnitude. In the drawing there thus have been illustrated in each case only the current transformer 10a for one phase of the power converter group 1. By means of the output signal of the comparison element or comparator 9 there are influenced or controlled in each case the bypass or shunt switches 14a and 14b connected with the direct-current pole or terminal of the power converter groups 1 and 2. These bypass switches 14a and 14b can comprise mechanical switches of conventional design.

As to the description of the method of the invention given hereinafter there is assumed that the power converter group 2 is in operation, i.e. the bypass or shunt switch 14b is open. The power converter group 1 should be placed into operation. The bypass or shunt switch 14a is therefore initially still closed. During the placement into operation of the power converter group 1 there should not be disturbed the operation of the power converter group 2. During a first method step the control pulses of the power converter group 1 which is to be placed into operation are set at a range of 100 to 115 electrical degrees with the aid of the control signal device 8 and the control circuits 7. Thereafter, the bypass or shunt switch 14a receives an opening command.

In the event that the power converter group 1 should operate in the rectifying mode, in other words in the event that the placement into operation of the system should be accomplished at the rectifying end, then the control pulses for the thyristors of the power converter bridge circuits 11 and 12 are shifted or displaced in the rectifying range according to a linear ramp function, i.e. with a predetermined linear ascent in a desired adjustable or settable time, as soon as the auxiliary contact of the bypass or shunt switch 14a reports back the opening of such switch 14a.

In the event that the power converter group 1 should operate in the inverting mode, in other words if there should be accomplished placement into operation thereof at the inverting side of the system, then the control pulses for the thyristors of the power converter bridge circuits 11 and 12 are controlled with an adjustable ramp or ramp function initially in the rectifying mode at an adjustable threshold angle of approximately 85 electrical degrees and thereafter controlled back into the inverting mode until attaining the greatest possible control angle, as soon as the auxiliary contact of the shunt switch 14a has reported back the opening of such switch 14a. In order to input or set the ramp function the power transmission is influenced in a prior predetermined manner, for instance with linear ascent in a desired settable time. Furthermore, the current is commutated in the power converter group 1 by the switch 14a without endangering the switch.

In both cases there is accomplished a release of the control angle setting or input after expiration of the ramp function. In the first instance the control voltage of a conventional load current-or pole current regulator, for instance as disclosed in the aforementioned German Patent Publication No. 2,512,364, published Oct. 16, 1975 delivers the control pulses, and in the second instance a conventional extinguishing angle regulator, for instance as disclosed in the textbook authored by Edward Wilson Kimbark, entitled "Direct Current Transmission", Volume 1, Pages 167 to 169, published by Wiley-Interscience, a division of John Wiley & Sons, Inc., New York, London, Sydney, Toronto (1971) delivers the control pulses.

Furthermore, the current which has been detected by means of the current transformer 10a and rectified with the aid of diodes in the line between the power converter transformers 3 and 4 and the power converter bridge circuits 11 and 12, respectively, is compared with the direct-current detected at the current transformers 10b at the direct-current line 13 with the aid of the comparison element or comparator 9. In the event of a longer lasting deviation of both currents the bypass or shunt switch 14a again receives a switch-on command and also for the power converter group 1 a bypass or shunt control with subsequent control pulse blocking.

Also with this method there is unavoidable a reactive power surge which, however, can be maintained so brief in accordance with the set run-up ramp that the network regulation of the reactive power is practically not affected thereby. Associated with the reactive power surge is a briefly lasting drop in the network voltage. There are avoided overvoltages.

During placement of the system into operation at the inverting end it is advantageous, in order to avoid flipping at the regulator of the inverter station to provide a modulation which produces a brief pre-control of the control angle as soon as there begins the displacement or shifting of the control pulses of the power converter which is to be placed into operation. The thus caused temporary drop in the direct-current voltage at the inverting end or side of the system is without significance, since the current regulator at the rectifying side thereafter reacts with a corresponding drop in the voltage at the rectifying end or side of the system.

A prerequisite for the achievement of the placement into operation of the power converters is that the bypass or shunt switch 14a is properly switched. To protect the bypass switch 14a, in the event of switching failure, there is used for this purpose the provided comparison of the currents at the three-phase side and the direct-current side of the power converter which is to be placed into operation. If there is present a voltage measurement of the power converter group then there can be employed as an additional criterion for the achievement of the commutation the presence of the 12-pulse power converter group voltage.

Placement of the power converter group 1 out of operation is accomplished by a bypass or shunt control of the power converter and turning-on of the bypass switch 14a. Previously there is advantageously accommodated the pole voltage to the new operating mode by down-controlling the voltage of the power converter group 1 to null. It is however also possible to accomplish a bypass or shunt control without any preceding down-control of the pole potential or voltage. In that case however the direct-current must previously be appropriately reduced, —when working with two groups in other words to about one-half—, in order to avoid active power surges or jumps. A special cut-off regulator is therefore not needed.

While there are shown and described present preferred embodiments of the invention, it is to be distinctly understood, that the invention is not limited thereto, but may be otherwise variously embodied and practiced within the scope of the following claims. Accordingly,

What we claim is:

1. In a method of placing into operation one power converter group operating in a rectifying mode of a number of power converter groups which with respect to a direct-current are connected in series and with respect to an alternating-current are connected in parallel of a high voltage direct-current power transmission installation, wherein a bypass switch is connected in parallel with each power converter group, the improvement which comprises the steps of:
    setting control pulses of one power converter group of the power converter groups which is to be placed into operation at a range of approximately 100 to 115 electrical degrees;
    thereafter delivering an opening command to the bypass switch of such one power converter group in order to open said bypass switch;
    said control pulses, after accomplishing opening of said bypass switch, being shifted according to a predeterminable linear ramp function in a rectifying range; and
    thereafter setting the control pulses to be load-current dependent.

2. The method as defined in claim 1, further including the steps of:
    comparing a rectified current in an infeed line of the one power converter group which is to be placed into operation with current in a direct-current line; and
    upon the presence of a longer lasting deviation of both currents delivering to the bypass switch a switching-on command and undertaking for the one power converter group a bypass control with subsequent control pulse blocking.

3. In a method of placing into operation one power converter group operating in an inverting mode of a number of power converter groups which with respect to a direct-current are connected in series and with respect to an alternating-current are connected in parallel of a high voltage direct-current power transmission installation, wherein a bypass switch is connected in parallel with each power converter group, the improvement which comprises the steps of:
    setting control pulses of one power converter group of the power converter groups which is to be placed into operation at a range of approximately 100 to 115 electrical degrees;
    thereafter delivering an opening command to the bypass switch of such one power converter group in order to open said bypass switch;
    said control pulses, after accomplishing opening of said bypass switch, being displaced according to a predeterminable linear ramp function in a rectifying range;
    shifting the control pulses, upon accomplishment of opening of the bypass switch, by means of a predeterminable linear ramp function initially in a rectifying mode until reaching a predeterminable control threshold angle of approximately 85 electrical degrees;
    thereafter accomplishing a revertive control of the control pulses in an inverting mode until reaching a predetermined greatest possible control angle; and
    thereafter setting the control pulses as a function of an extinguishing angle.

4. The method as defined in claim 3, further including the steps of:
    comparing a rectified current in an infeed line of the one power converter group which is to be placed into operation with current in a direct-current line; and
    upon the presence of a longer lasting deviation of both currents delivering to the bypass switch a switching-on command and undertaking for power rectifiers of the one power converter group a bypass control with subsequent control pulse blocking.

* * * * *